United States Patent
Feig (12)

(10) Patent No.: US 10,219,640 B2
(45) Date of Patent: Mar. 5, 2019

(54) MICRO-CLIMATE DISPLAY ENCLOSURE

(71) Applicant: Jerome Feig, Huntington Woods, MI (US)

(72) Inventor: Jerome Feig, Huntington Woods, MI (US)

( * ) Notice: Subject to any disclaimer, the term of this patent is extended or adjusted under 35 U.S.C. 154(b) by 997 days.

(21) Appl. No.: 14/206,761

(22) Filed: Mar. 12, 2014

(65) Prior Publication Data

US 2014/0278178 A1    Sep. 18, 2014

Related U.S. Application Data

(60) Provisional application No. 61/781,010, filed on Mar. 14, 2013.

(51) Int. Cl.
*A47G 1/06*    (2006.01)
*A47G 1/12*    (2006.01)
*G01M 3/32*    (2006.01)

(52) U.S. Cl.
CPC .............. *A47G 1/06* (2013.01); *A47G 1/12* (2013.01); *G01M 3/3272* (2013.01)

(58) Field of Classification Search
CPC . A47F 3/001; A47F 1/08; C03C 17/34; E06B 9/68; E06B 9/264; G03B 21/142; B60J 10/70; A47G 1/06; A47G 1/12; G01M 3/3272
USPC .......... 312/31, 114; 359/265, 277; 135/155; 700/245; 211/115; 160/121.1; 296/201
See application file for complete search history.

(56) References Cited

U.S. PATENT DOCUMENTS

| | | | | |
|---|---|---|---|---|
| 4,723,809 A * | 2/1988 | Kida | ........................ | B60J 10/70 296/201 |
| 5,127,715 A * | 7/1992 | Doyle | ........................ | A47F 1/08 211/115 |
| 5,127,718 A * | 7/1992 | Paine | ........................ | A47F 3/001 312/114 |
| 7,281,561 B2 * | 10/2007 | Anderson | ............... | E06B 9/264 160/121.1 |

(Continued)

FOREIGN PATENT DOCUMENTS

WO    WO 2013095352 A1 *    6/2013    ........... H05K 7/1498

OTHER PUBLICATIONS

NIST, "Charter Service: Encasing the Magna Carta", Feb. 2012, 2 Pages.*

(Continued)

*Primary Examiner* — Kaleria Knox
(74) *Attorney, Agent, or Firm* — Avery N. Goldstein; Blue Filament Law PLLC

(57) ABSTRACT

An enclosure for displaying artwork, historical documents, and artifacts that require controlled atmospheric conditions is provided that is low cost and less cumbersome compared to existing microclimate enclosures. The enclosure has a frame construction that is easy to set up, maintain, and monitor with a hypoxic/anoxic microclimate that protects against, oxidation of its contents, pests, and bacterial growth. The enclosure is suitable for: paintings, works on paper, ephemera, textiles, mineral specimens, archeological metallic artifacts, animal skins and other organic items, rubber and polymers, and items susceptible to insect damage. A method of testing and servicing one or more enclosures is also provided.

19 Claims, 11 Drawing Sheets

(56) References Cited

U.S. PATENT DOCUMENTS

| | | | |
|---|---|---|---|
| 8,270,059 B2* | 9/2012 | Friedman | C03C 17/34 359/265 |
| 2003/0029069 A1* | 2/2003 | Vihos | B44C 5/02 40/718 |
| 2009/0015114 A1* | 1/2009 | Vihos | A47F 3/001 312/31 |
| 2009/0027759 A1* | 1/2009 | Albahri | B60J 3/04 359/277 |
| 2014/0039674 A1* | 2/2014 | Motoyama | G03B 21/142 700/245 |

OTHER PUBLICATIONS

Zane-Cunningham Presentation at Tate Microfading "Designing Low Oxygen Frames" Design Concept; Anoxia and Microfading: The Impact on Collection Care—Part 4, Oct. 26, 2011, 3 pages; plus NIST Builds Enclosure to Display and Protect the 1297 Magna Carta for the National Archives; Submitted on Feb. 2, 2012—4:35 pm.

Maekawa, Shin, "Oxygen-Free Museum Cases", The Getty Conservation Institute—Research in Conservation (1998), 81 pages, © 1998 by the J. Paul Getty Trust; https://www.getty.edu/conservation/publications_resources/pdf_publications/pdf/oxygenfree.pdf.

* cited by examiner (Detail A-A)

MICRO-CLIMATE DISPLAY ENCLOSURE

This application claims priority benefit of U.S. Provisional Application Ser. No. 61/781,010 filed Mar. 14, 2013; the contents of which are hereby incorporated by reference.

FIELD OF THE INVENTION

The present invention in general relates to display cases and in particular to enclosures for displaying artwork, historical documents, and artifacts that require controlled atmospheric and light exposure conditions.

BACKGROUND OF THE INVENTION

Hypoxic microclimate storage technology has been widely used for many years in the food industry. As a basis of preservation, an inert gas such as nitrogen or argon is used to displace air and moisture in packaging to extend the shelf lives of package contents. Gases such as noble gases like argon, nitrogen, and carbon dioxide tend to inhibit oxidation, hydrolysis, and other chemical reactions, which degrade the enclosed products. The conservation field has embraced this microclimate technology to the preserve art, historical artifacts, documents, and archeological. Exemplary artifacts contained in reduced oxygen or anoxic microclimate storage technology are the founding documents of the United States in the National Archives, Washington, D.C.; and mummies in the Egyptian Museum of Antiquities in Cairo, Egypt.

Research on the use of micro climates with anoxic or hypoxic atmospheres started in the late 1980's at the Conservation Institute at the Getty Museum in California. The Getty research centered on the use of nitrogen, argon and other inert gases in the conservation storage and display of artifacts. The Getty Museum published a paper on the subject in entitled 1998 Oxygen-Free Museum Cases (1998, Edited by Shin Maekawa).

Microfading is an accelerated method for assessing the vulnerability of individual museum objects to light-fading, including those for which the identity of the colorant is unknown. During the microfading process a small area typically about 0.3-0.4 mm$^2$ on the surface of an object is faded to an imperceptible degree using a powerful but cold source of visible light and spectral change is tracked in real time using visible reflectance spectroscopy. The microfading process provides exposures equivalent to 5-10 years display at normal museum light levels that are achieved within a 10 minute test period, and the results are routinely used to set exhibition and loan display conditions for a particular object based on its measured sensitivity to light. The microfading process is important for conservators, who are routinely asked to set "safe" display conditions for objects, and yet the fading rate of even a known colorant typically varies significantly with a range of factors associated with its physical and chemical environment (e.g., mordants), origin, processing, manufacture, application and past history. Many of these factors like mordants, prior fading or the identity of the dye itself are either unknowable in principle, or too difficult and expensive to routinely determine.

Despite the advances in preservation technologies, enclosures for displaying precious art work and artifacts remain quite costly and cumbersome. Thus, there exists a need for low cost and less cumbersome microclimate display enclosure that is easy to set up, maintain, and monitor.

SUMMARY OF THE INVENTION

An enclosure for displaying artwork, historical documents, and artifacts that require controlled atmospheric conditions is provided that is low cost and less cumbersome compared to existing microclimate enclosures. The enclosure has a frame construction that is easy to set up, maintain, and monitor with a hypoxic/anoxic microclimate that protects against, oxidation of its contents, pests, and bacterial growth. The enclosure is suitable for: works on paper, ephemera, textiles, mineral specimens, archeological metallic artifacts, animal skins and other organic items, rubber and polymers, paintings, and items susceptible to insect damage.

A method of testing and servicing one or more enclosures is also provided, the method including: receiving data on conditions in the one or more enclosures, the data sent by a telemetry device positioned in the enclosure; analyzing the received data with an algorithm resident on a computing device to determine if the conditions in the enclosure have degraded to a specified threshold for an object contained in the enclosure; wherein in the event the threshold is reached in at least one of the one or more enclosures, a warning is initiated, and in response to the warning a technician is dispatched to the at least one enclosure for examination and required repairs; and wherein the warning is in the form of at least one of an auditory alarm, or an electronic message that identifies the at least one enclosure and one or more of the condition and a likely cause for the warning. The method further includes servicing and testing the one or more enclosures on a rotation prior to reaching the threshold; and wherein servicing and testing includes at least one of leak testing, having gaskets repaired, corrosion testing, checking glass light transmisivity, sensor calibration, or a combination thereof.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention.

DESCRIPTION OF THE INVENTION

The present invention has utility as an enclosure for displaying artwork, historical documents, and artifacts that require controlled atmospheric conditions. Embodiments of the invention provide for low cost and less cumbersome display enclosures compared to existing microclimate enclosures. Embodiments of the inventive enclosure are easy to set up, maintain, and monitor. In other inventive embodiments, an enclosure has a microclimate hypoxic/anoxic framing enclosure that protect against, oxidation of its contents, pests, and bacterial growth. Embodiments of the enclosure are suitable for: paintings, works on paper, ephemera, textiles, mineral specimens, archeological metallic artifacts, animal skins and other organic items, rubber and polymers, and items susceptible to insect damage.

In other inventive embodiments, an enclosure has a frame and back plate that are made of low cost and lightweight materials such as aircraft grade aluminum, with a durable anodized surface or optional powder painted surfaces. In other inventive embodiments, an enclosure is formed of aluminum that is tubular aluminum or from aluminum extrusions. Embodiments of the inventive enclosure are sealed with common fasteners such as recessed #6 or #8 button-head screws and quad-lobe O-ring gaskets that provide an gas-tight seal for up to twenty years before evaluation of contents. An inventive enclosure in some embodiments is configured with stainless steel metal one way valves—inlet and exhaust—with double or triple seals that provide a custom internal micro climate with custom gas mixtures and humidity levels that is also able to support positive pressure over ambient atmospheric pressure in the enclosure interior capable to reduce possible contamination. In other embodiments, artifacts placed in the enclosure may be viewed clearly without distortion through a top sheet of glazing such as 6 mm laminated glass—with an anti-reflective coating and 98% or better UV filtering of standard green, water white glass—annealed or tempered. In certain embodiments of the present invention, electrochromic glass is used for variable control of light entering the enclosure. The frame of the inventive enclosure may be configured in custom sizes for two dimensional (2-D) or three dimensional (3-D) items, and may be surrounded with conventional picture frame moldings. Within the enclosure area there is space for environmental materials for atmospheric controls such as zeolites and activated carbon for contamination absorption, oxygen absorbers, silica gel (desicant-moisture absorbers), as well as test/indicator strips, data logging sensors, and an expandable bag for barometric control. In other inventive embodiments, atmospheric control materials are kept out of the site of viewers by placing the materials behind the protected object on a raised perforated platform.

Figure 1:
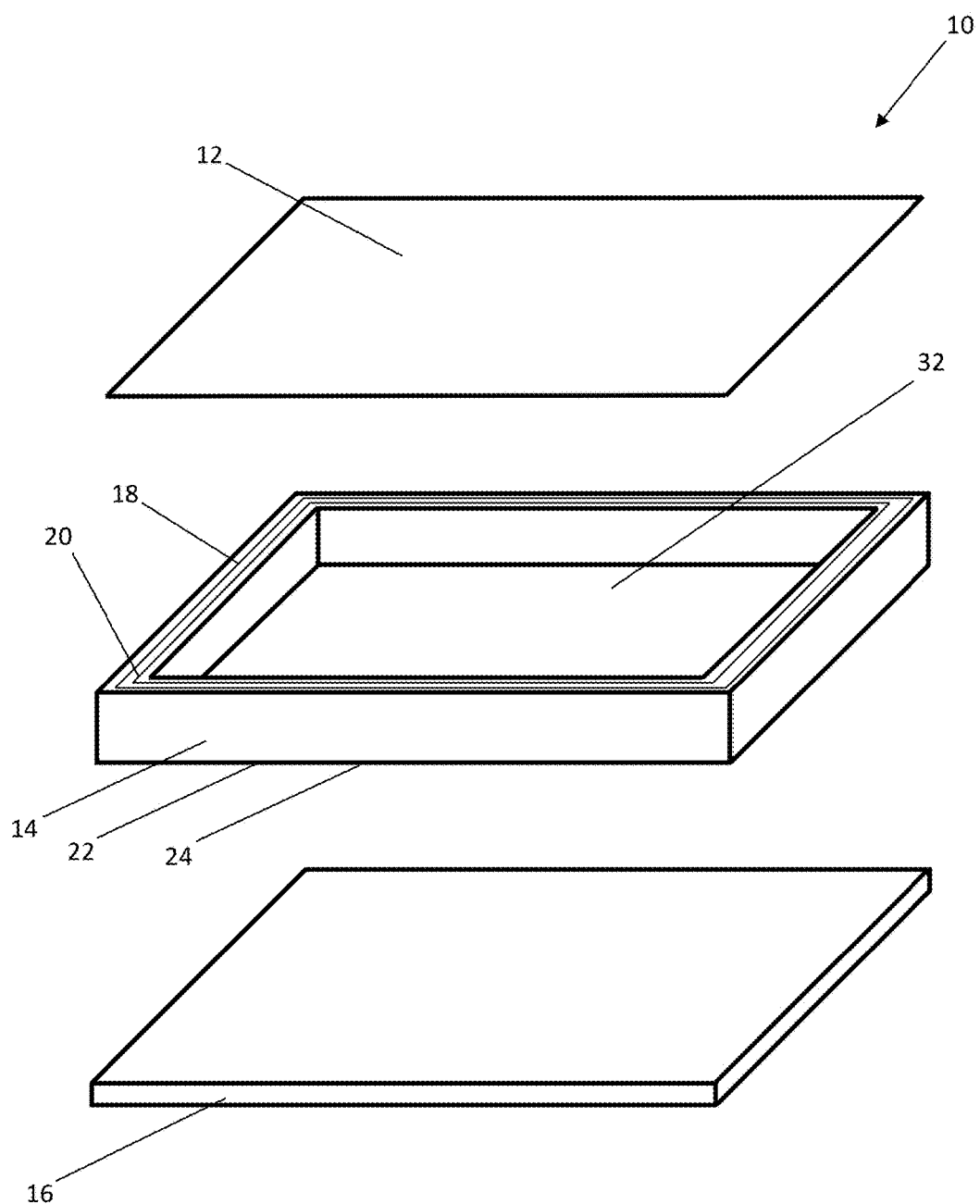
FIG. 1 is an exploded perspective drawing showing the enclosure cover (glazing), frame, and back plate according to embodiments of the invention.
Figure 2A:
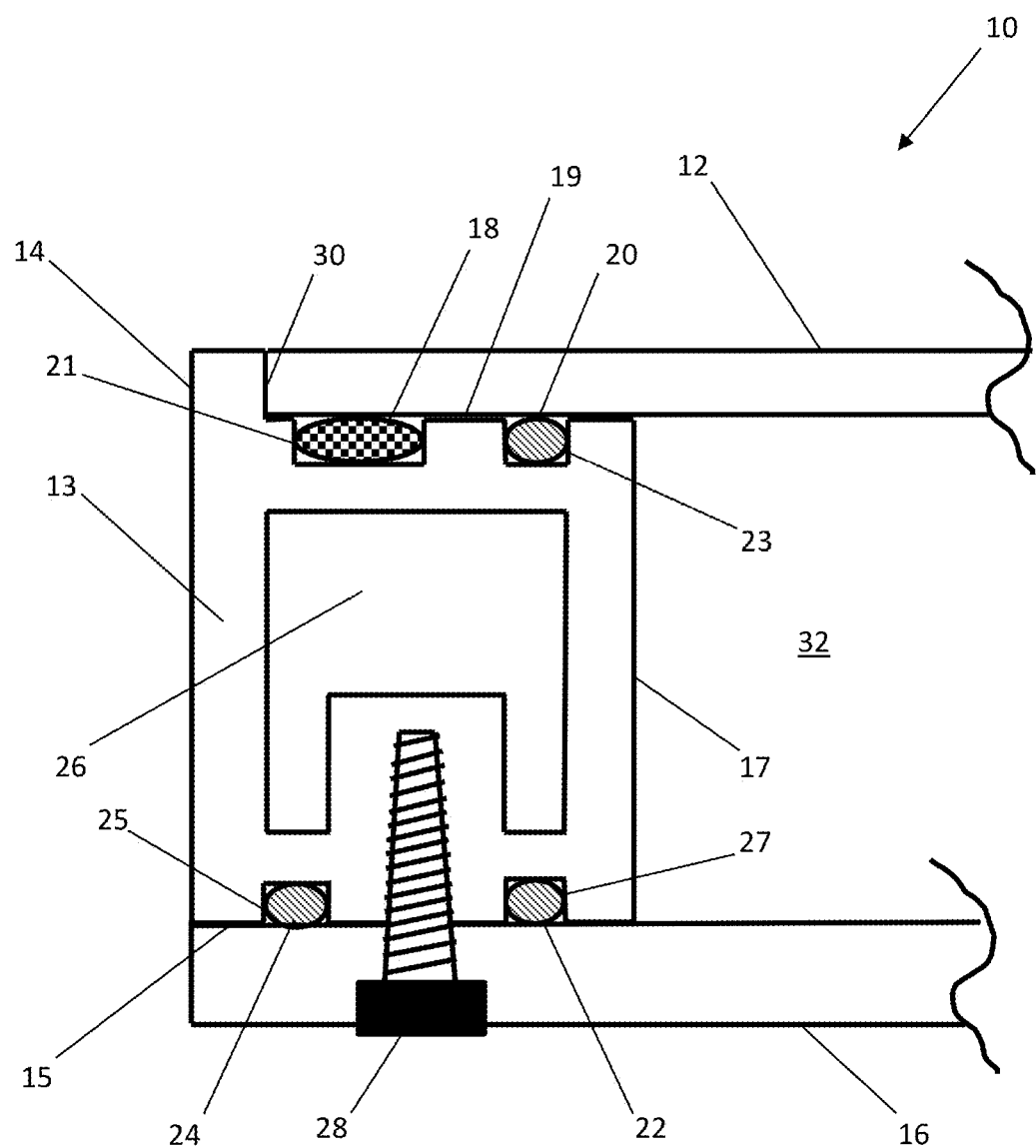
FIG. 2A is a cross-sectioned view with the cover and back plate secured to the frame according to embodiments of the invention.
Figure 2B:
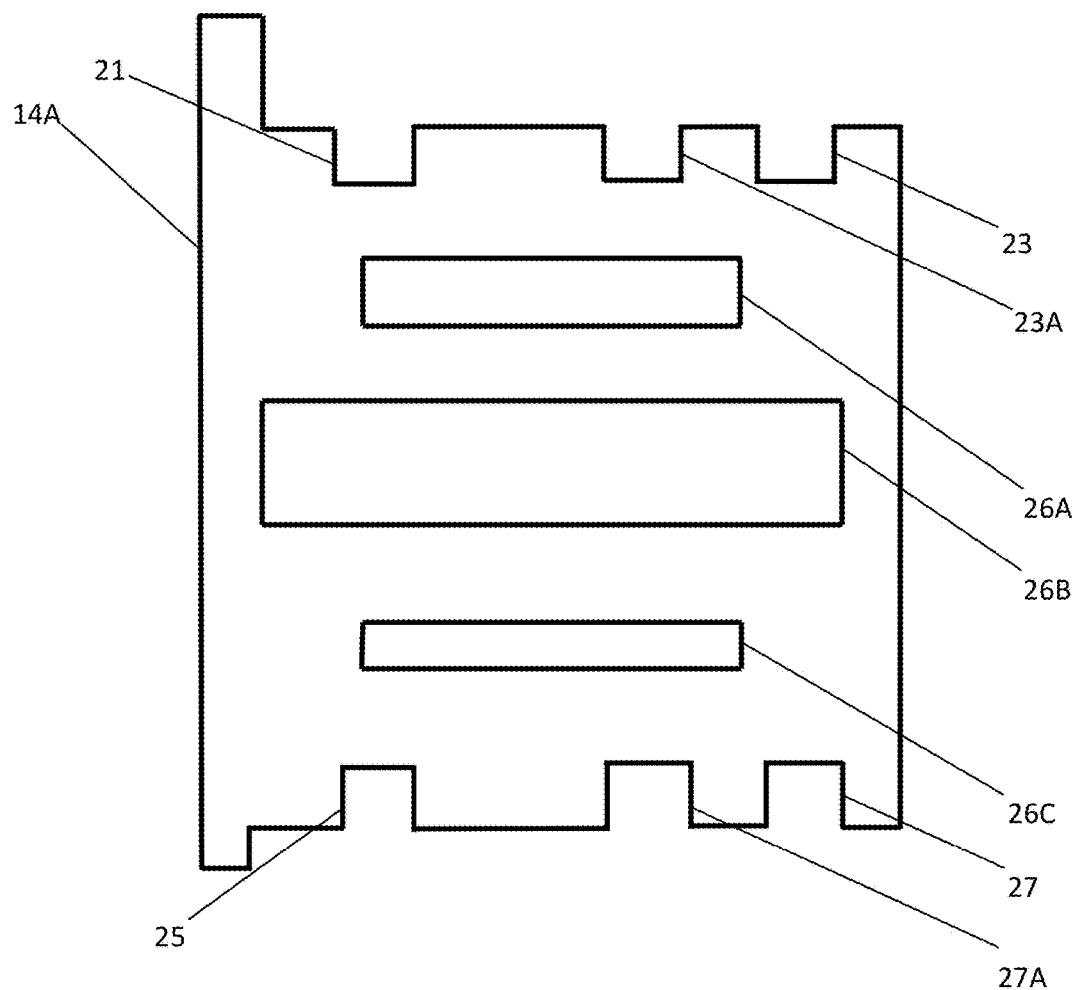
FIG. 2B is a cross-sectional view of an alternative embodiment of an extrusion frame according to an embodiment of the invention.

Referring now to the figures, an inventive enclosure is shown generally at 10 in FIGS. 1 and 2A. The enclosure 10 includes a cover 12 that rests and is secured to a top surface 19 of a frame 14. In an embodiment the cover 12 may be sheet of glazing such as 6 mm laminated glass—with an anti-reflective coating and 98% UV filtering of standard green, water white glass—annealed or tempered. In an embodiment the cover 12 is electrochromic glass with variable control of light entering the enclosure. The shading of the electrochromic glass may be controlled electronically via a user interface, or the shading may change automatically based on the lighting conditions incident to the cover 12. In still another embodiment, an adhesive sealant 18 applied in a channel 21 secures the cover 12 to the frame 14 in conjunction with a lip 30 extending from the top surface 19 along the perimeter of the outer surface 13 of the frame 14. In still another embodiment, the frame 14 is formed of a light weight and durable material such as aircraft grade aluminum, with a durable anodized surface or optional powder painted surface. In an embodiment the aluminum may be tubular aluminum or made from aluminum extruded with a hollow area 26. A second channel 23 on the top surface 19 secures a quad lobe O-ring gasket 20 between the frame 14 and cover 12. FIG. 2B is a cross-sectional view of an alternative embodiment of an extrusion frame 14A with an additional channels 23A and 27A for holding an additional gasket according to an embodiment of the invention. Hollow areas 26A and 26C are for insertion of two steel reinforcement "L's" at the epoxied corners. The larger 26B cavity affords a weight reduction in particular inventive embodiments, while cavity 26B is omitted from others embodiments.

Figure 2C:
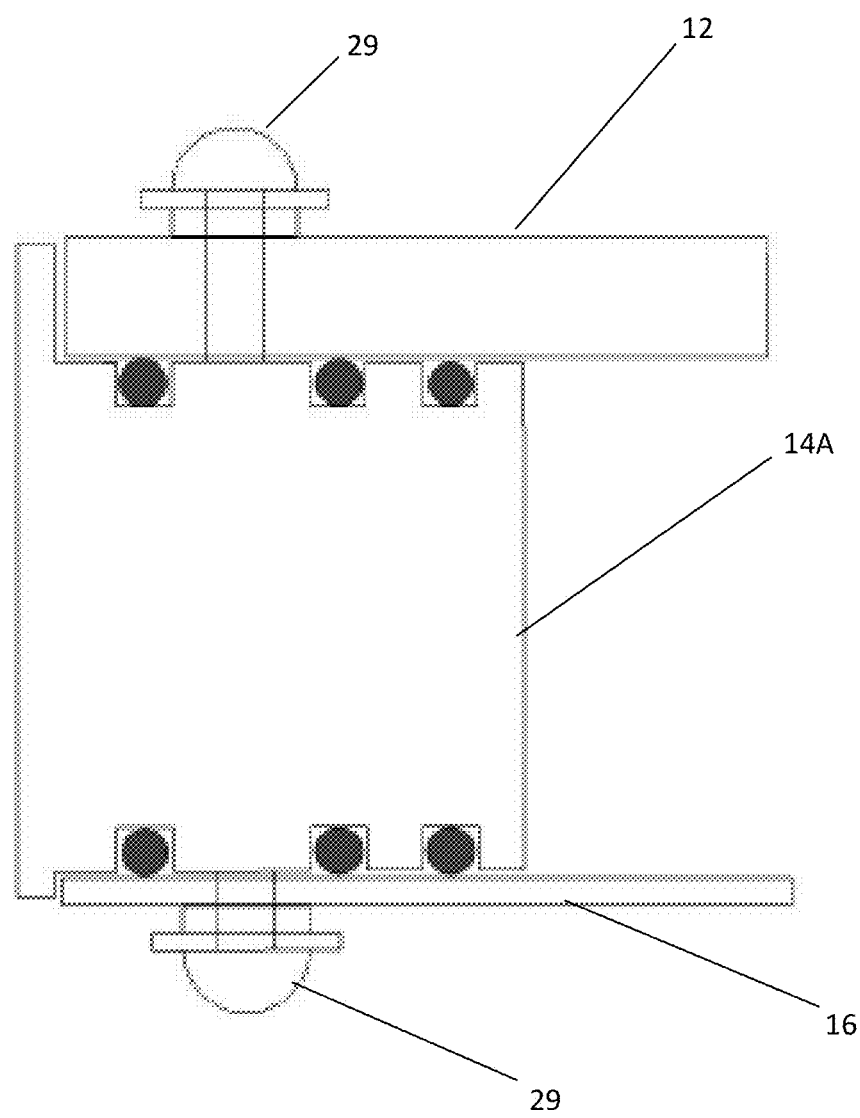
FIG. 2C is a cross-sectional view of the extrusion frame of FIG. 2B with a cover and back plate secured to the frame with button screws according to an embodiment of the invention.
Figure 3A:
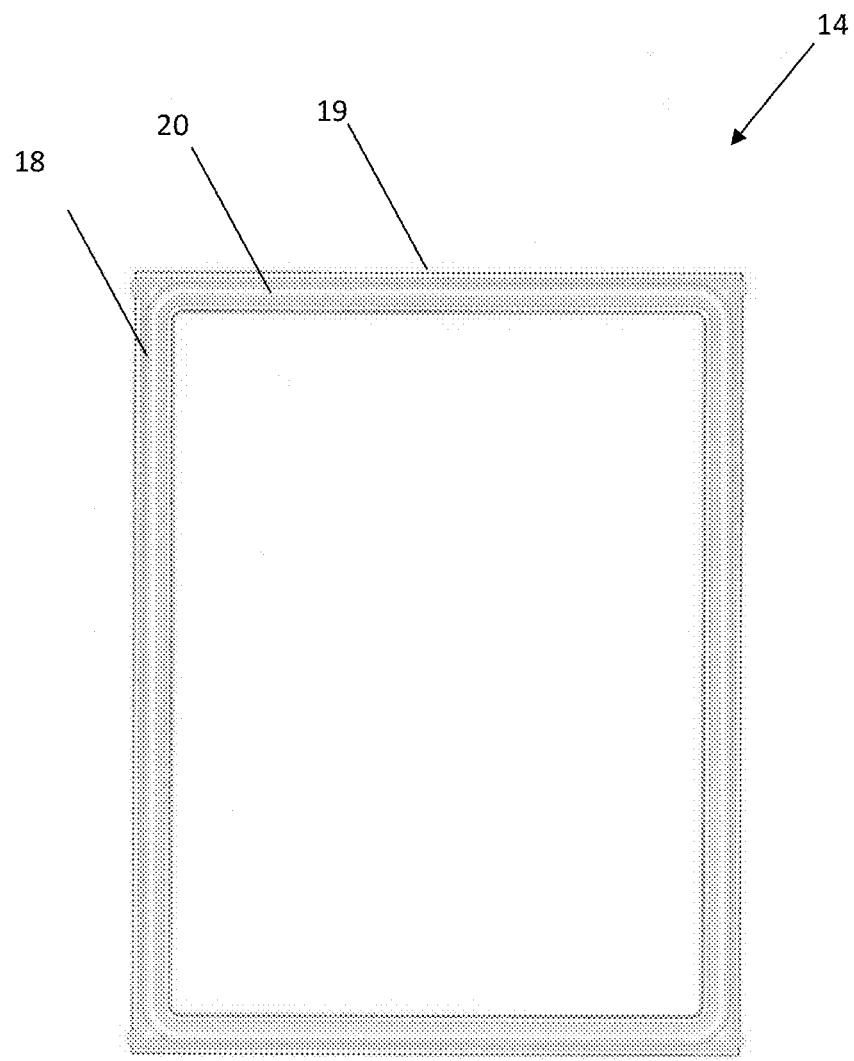
FIG. 3A is a top plan view of the frame with adhesive and gasket applied according to embodiments of the invention.
Figure 3B:
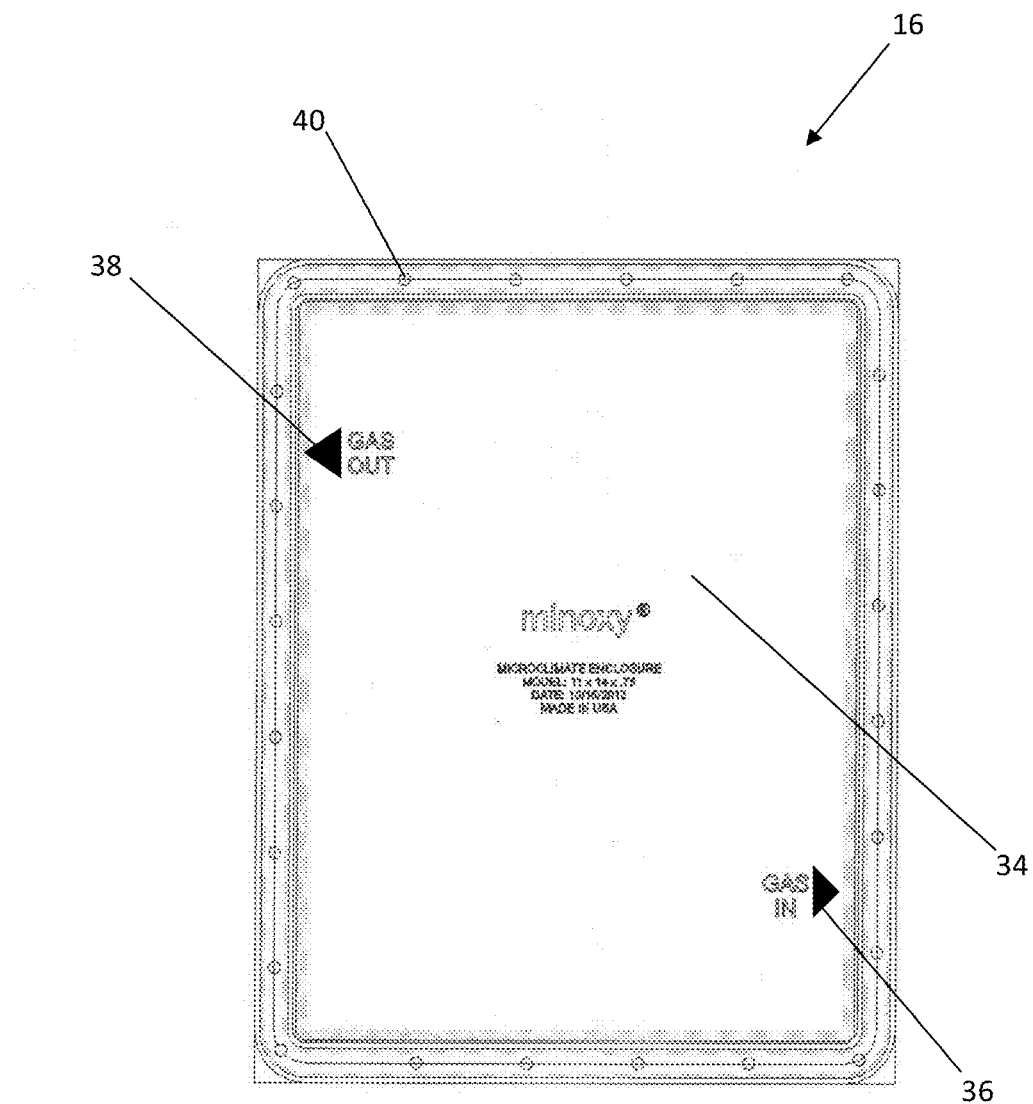
FIG. 3B is top plan view showing the exterior or rear of the back plate according to embodiments of the invention.
Figure 7:
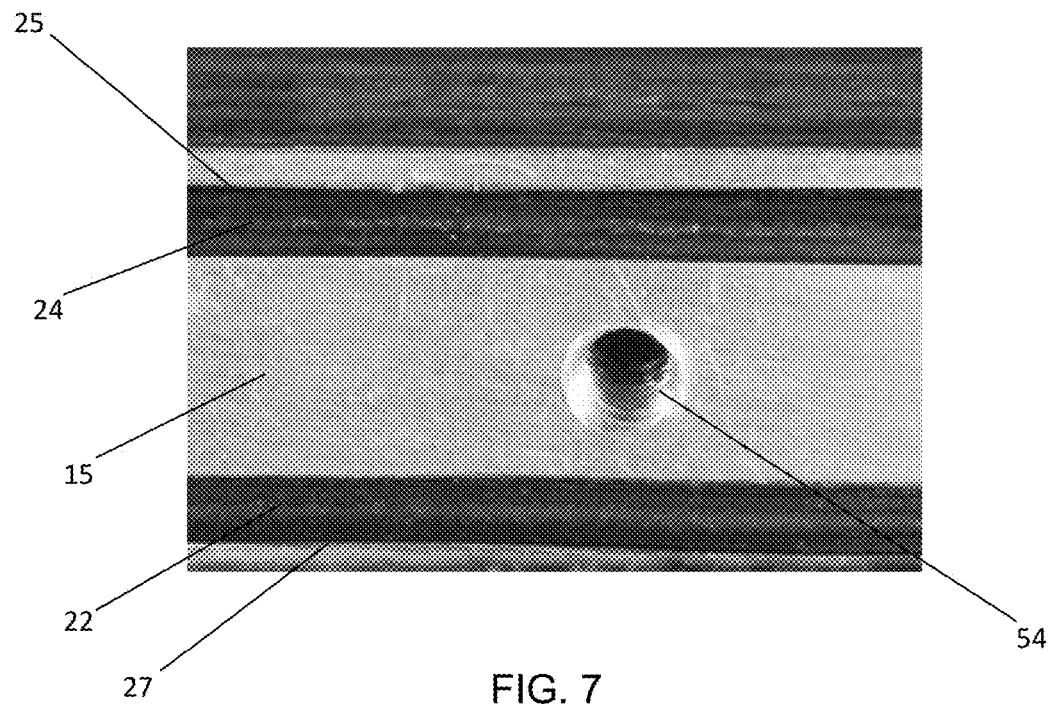
FIG. 7 is detail view of the bottom of the frame showing the inner and outer gasket and a threaded hole for receiving a fastener to secure the back plate to the frame.

FIG. 3A is a top plan view of the frame 14 with adhesive 18 and gasket 20 in place according to embodiments of the invention. The frame 14 has an outer side face 13 from which the retaining lip 30 extends, and through which inlet valves, outlet valves, and data lines are routed to the controlled atmosphere space 32. The enclosed controlled atmosphere space 32 is defined by inner wall 17, the cover 12, and metal sheet back plate 16 illustratively formed from aluminum. Channels 25 and 27 on the bottom surface 15 of the frame 14 secure gaskets 24 and 22, respectively, between the frame 14 and the back plate 16. The back plate 16 may be secured to the frame 14 with fasteners 28 such as tapered machine screws (as shown), or the holes in the frame 14 may be pre drilled, tapped, and grooved to accept common fasteners such as recessed #6 or #8 button head screws. FIG. 2C is a cross-sectional view of the frame 14A with cover 12 and metal sheet back plate 16 secured to frame 14A with button screws 29. FIG. 7 illustrates a top down view of channels 25 and 27 on the bottom surface 15 of the frame 14 to secure o-ring gaskets 24 and 22, respectively, and a pre drilled, tapped hole 54 to engage a fastener for securing the back plate 16. FIG. 3B is top plan view showing the exterior bottom or rear surface 34 of the back plate 16 with recessed holes 40 for fasteners 28. Legends 36 and 38 printed or embossed on the rear surface 34 and indicate the locations of the inlet and outlet valves, respectively. It is noted that for illustrative purposes the inventive enclosure 10 is depicted as a rectangular in shape, however additional shapes such as square, circular, oval, triangular, or free-form are within the scope of the invention to accommodate specific artifacts.

Figure 4A:
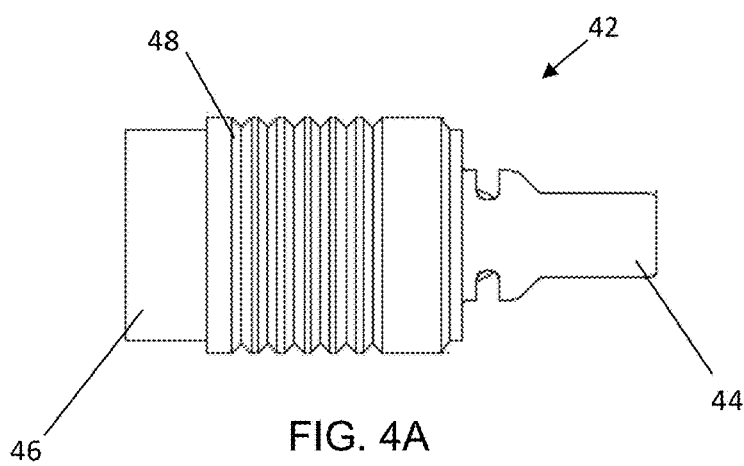
FIGS. 4A-4I illustrate various views of the gas input, purging exit valve, and accompanying mounting holes according to embodiments of the invention.
Figure 4B:
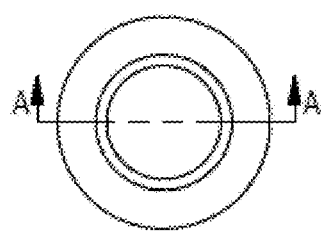
Figure 4C:
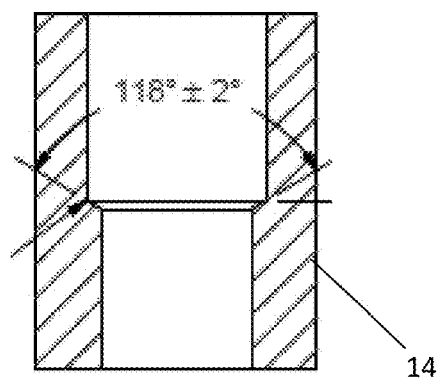
Figure 4D:
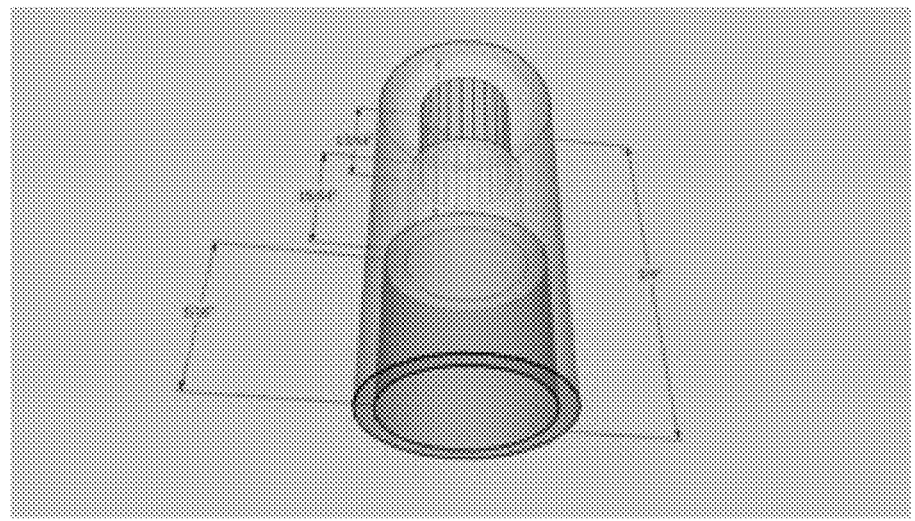
Figure 4E:
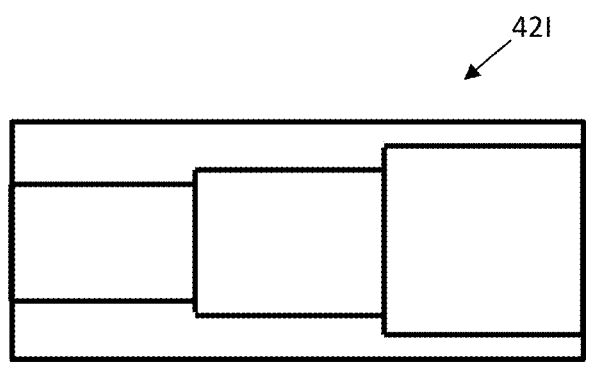
Figure 4F:
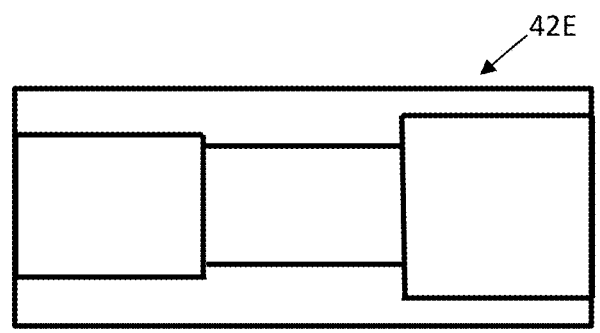
Figure 4G:
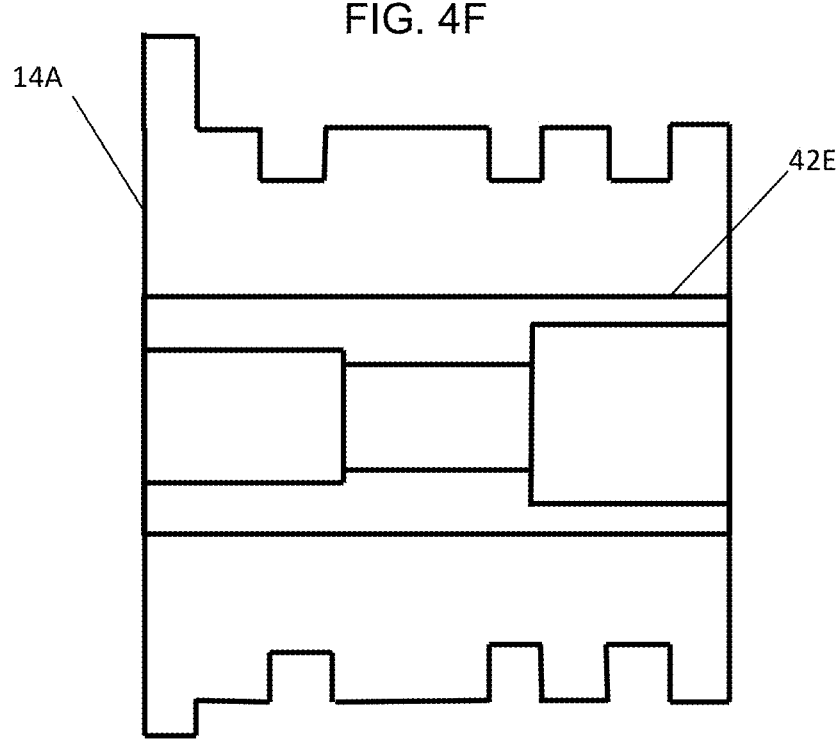
Figure 4H:
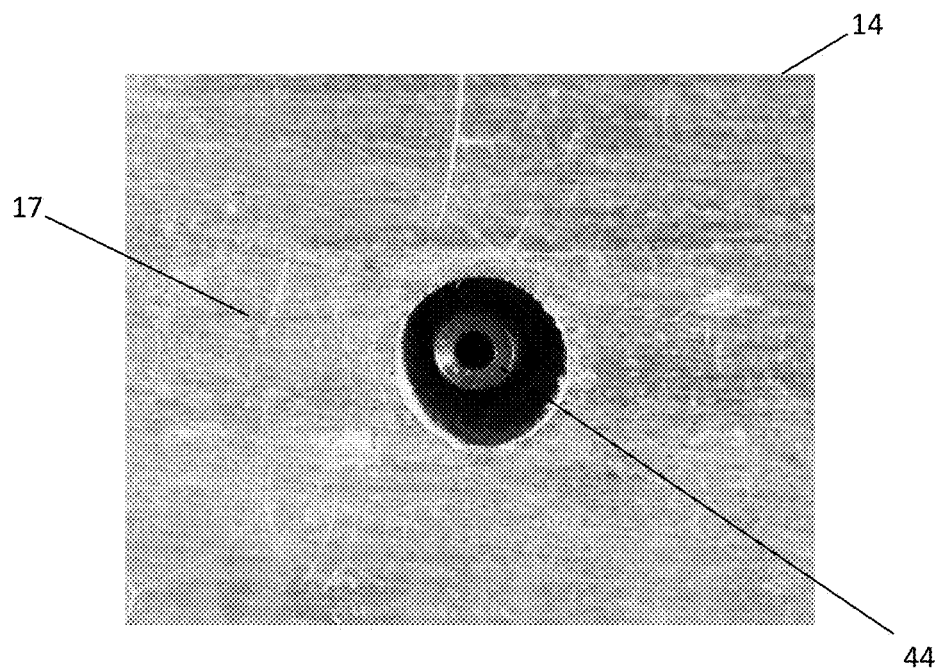
Figure 4I:
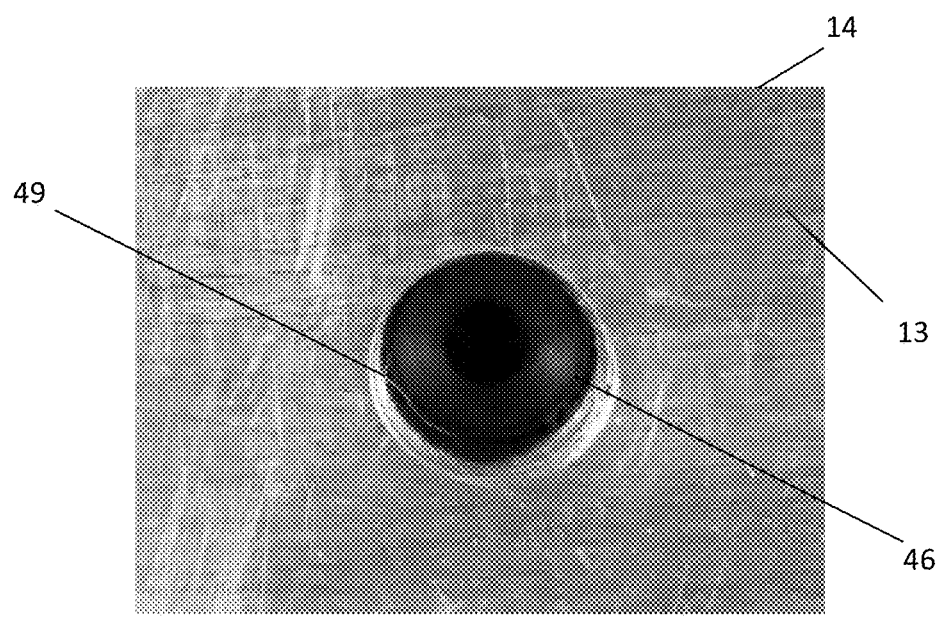

FIGS. 4A-4F illustrate various views of the gas input and purging exit valve 42 and accompanying mounting holes according to embodiments of the invention. Air or gas enters at inlet side 46 and exits at outlet side 44. Flow in the opposite direction is restricted or checked. The valve 42 is a compression fitting that extends rings into 14 for insertion and engagement in a pre-drilled and machined telescopic circular cavity or valve housing of varying concentric diameters that spans the frame 14 width as shown in FIGS. 4B-4D. FIG. 4A shows the valve 42 after it is compressed to grab the wall of the installation cavity or valve housing in the frame 14. FIG. 4B is a straight on view of the cavity or housing machined in the frame 14 for accommodating inlet or outlet valve 42. FIG. 4C is a cross-sectional view along line A-A showing the valve housing machined in the frame 14. FIG. 4D is a perspective view of the cavity for accommodating the valve 42; a threaded subcomponent to be inserted into the outer wall of the enclosure in some inventive embodiments. FIG. 4E shows an embodiment of an inlet valve 42I. FIG. 4F shows an embodiment of an exhaust valve 42E; a threaded subcomponent to be inserted into the outer wall of the enclosure in some inventive embodiments. FIG. 4G is a cross-sectional view of the exhaust valve 42E in extrusion frame 14A. FIG. 4H shows the valve 42 positioned in the frame 14 from the perspective of looking outward from the controlled atmosphere space 32 at the inner wall 17 with the outlet side 44 visible. FIG. 4I shows the valve 42 recessed in the frame 14 from the perspective of looking inward from outside the enclosure 10 at the outer wall 13 with the inlet side 46 visible in the entry opening 49.

Figure 5:
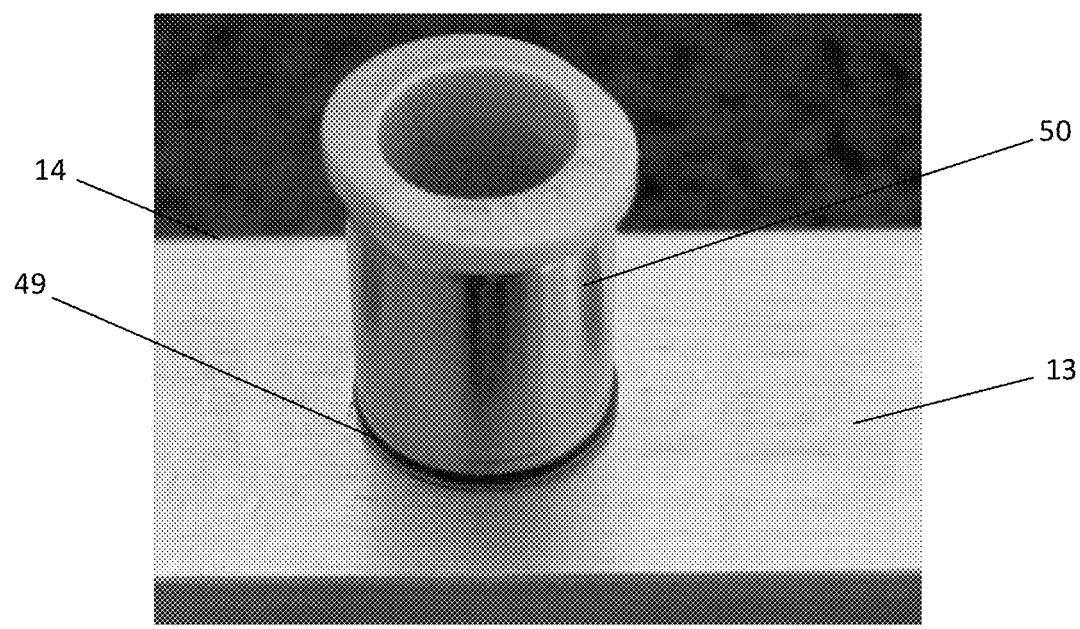
FIG. 5 is a quick connect for attachment of a gas input and purge line according to embodiments of the present invention.

FIG. 5 shows a threaded quick connect connector 50 for attachment of a gas input line and purge line during set up of the controlled atmosphere space 32 with the required mix or depletion of oxygen and other gases. The quick connect connector 50 is inserted or engaged with the outlet side 44 of the valve 42 via entry opening 49. As shown in 3B, gas is inputted on one side of the enclosure 10 and is exited at the opposite end of the enclosure 10 as indicated by the legends 36 and 38 printed or embossed on the rear surface 34. It is noted that in practice alternative locations on the same or different sides of the frame 14 may be used for locating the filling and purging valves within the spirit and scope of the invention. In operation a hose is connected to a source of gas to be inputted into the enclosure 10, and a second hose is optionally connected to collect the gas that will be expelled from the enclosure. Operatively nitrogen, argon and other inert gases used in the conservation storage and display of precious items may be inputted into the enclosure 10 as specified by a qualified conservator for custom conditioning of the enclosure or for permanent storage. It is appreciated that different gas mixtures are readily employed for conditioning and storage of an article.

Figure 6:
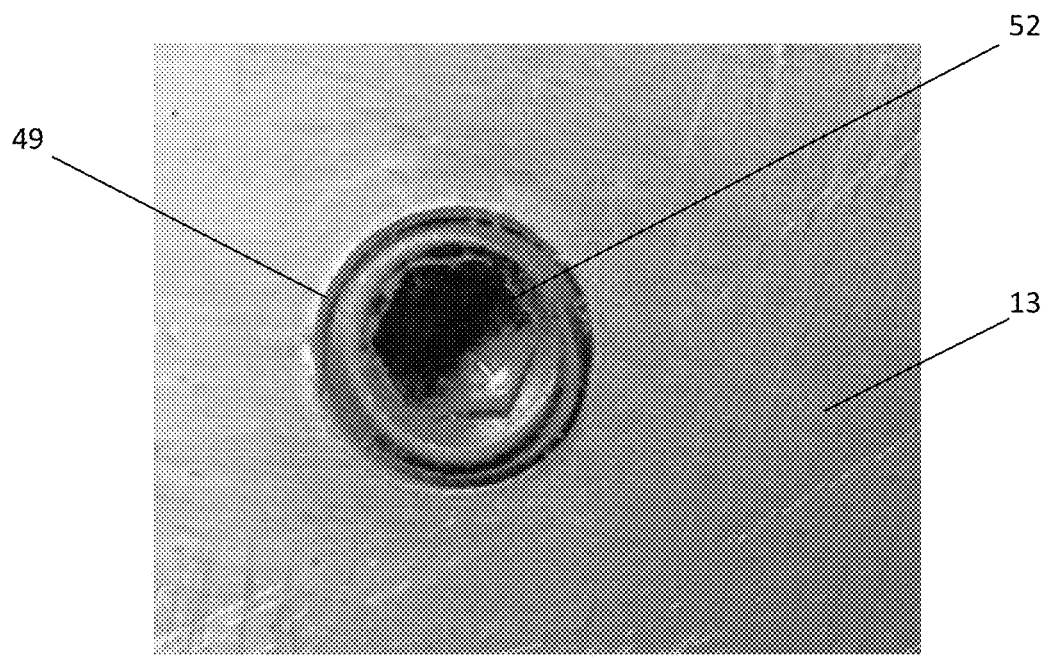
FIG. 6 shows a termination set screw placed in the threaded channel to seal access to the valve shown in FIGS. 4A-4F.

FIG. 6 shows a termination set screw 52 placed in the threaded entry opening 49 to seal access to the valve shown in FIGS. 4A-4F. The set screw 52 provides an extra insurance seal to the valve 42, and the set screw 52 is put in place when the quick connect connector 50 is removed.

Figure 8:
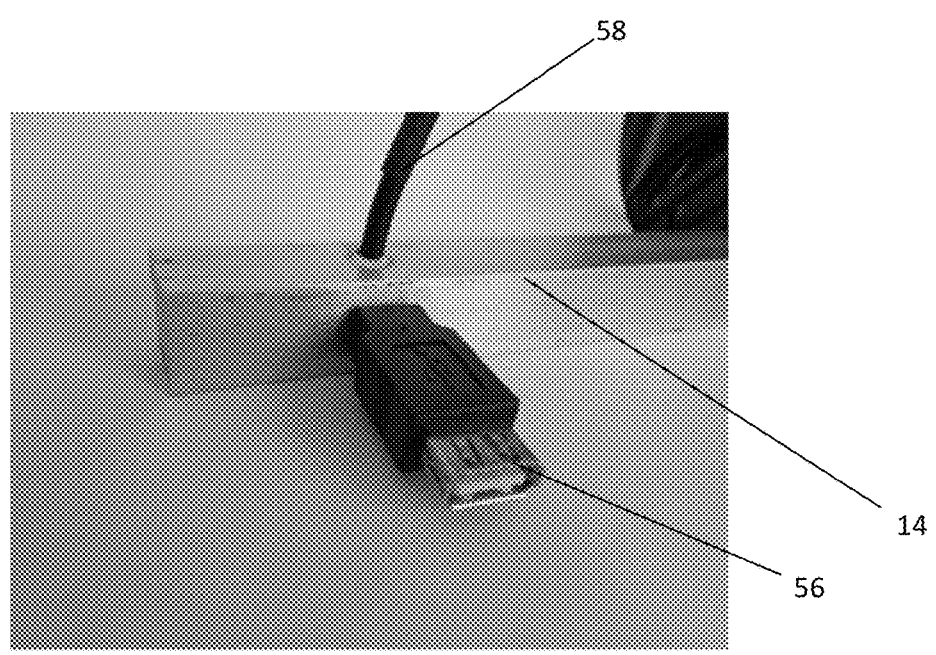
FIG. 8 shows a data line routed through the wall of the frame with a universal serial bus (USB) termination for connection with a telemetry device within the sealed enclosure.

FIG. 8 shows a data line 58 routed through the frame 14 with a universal serial bus (USB) termination 56 as an example of a user specified electrical connection for communication with a telemetry device within the sealed enclosure 10. A telemetry device measures various parameters such as humidity, barometric pressure, oxygen content, and other atmospheric components within the enclosure 10. A computing device may be connected to the telemetry device to record the measurement parameters, as well as to assist in the establishment of a required atmosphere within the enclosure. The connection or connections being a wired or wireless connection.

A method of testing and servicing an inventive enclosure is also described herein that involves the on display testing. Based on sensor data received from the telemetry device about the conditions within an inventive enclosure, damage to the enclosure is identified prior to catastrophic failure. When signals sent to the computing device, an algorithm is used to create a warning that conditions within an enclosure are degrading. This warning can be in the form of an auditory alarm, or an electronic message that identifies the condition and identity of the enclosure, and in some instances a likely cause. A technician is dispatched to examine the compromised enclosure and accomplish field repairs if possible, else arrange for shipment to a refurbishment facility. Rather than leaving enclosures in place until a failure occurs, a program is also provided in which refurbished enclosures are rotated on a routine basis such as for example every year, 2 years, 3 years, or more years with incoming enclosures being subjected to at least one test of: leak testing, having gaskets repaired, corrosion testing, glass light transmisivity checked, sensor calibration, or a combination thereof.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A controlled atmospheric enclosure comprising:
   a cover;
   a frame having a lip extending from a top surface along a perimeter of an outer surface of said frame and an internal hollow area, the top surface having a channel and a second channel;
   an adhesive sealant in the channel;
   an O-ring gasket in the second channel;
   a metal sheet back plate; and
   wherein said cover rests on and is adhesively secured to the top surface of said frame and said plate is mechanically secured to a bottom surface of said frame to form an airtight controlled atmospheric enclosed area for display of objects and artifacts.

2. The enclosure of claim 1 wherein said cover is a glazing.

3. The enclosure of claim 2 wherein said glazing is 6 mm laminated glass further comprising an anti-reflective coating and 98% UV filtering of standard green, water white glass that is annealed or tempered.

4. The enclosure of claim 2 wherein said glazing is electrochromic glass configured for variable control of light entering the enclosure.

5. The enclosure of claim 4 wherein shading of said electrochromic glass may be controlled electronically via a user interface, or the shading may change automatically based on the lighting conditions incident to said cover.

6. The enclosure of claim 1 wherein said top surface of said frame further comprises a first channel with an adhesive sealant and a second channel with an o-ring gasket, said adhesive sealant and o-ring gasket providing an airtight seal between said cover and said frame top surface.

7. The enclosure of claim 1 wherein said bottom surface of said frame further comprises a third channel and a fourth channel, both of said third and fourth channel configured for O-ring gaskets providing an airtight seal between said bottom surface and said back plate.

8. The enclosure of claim 1 wherein said frame and said back plate are made of low cost and lightweight materials including aircraft grade aluminum, with a durable anodized surface or powder painted surfaces.

9. The enclosure of claim 1 wherein said frame is formed of bar aluminum or from aluminum castings.

10. The enclosure of claim 2 wherein said back plate and said glazing are secured to said bottom surface of said frame with recessed #6 or #8 screws.

11. The enclosure of claim 1 further comprising one or more valves in threaded sub-components transiting from an outer side surface of said frame to said atmospheric enclosed area.

12. The enclosure of claim 1 further comprising metal L-shaped pieces inserted into adhesed corners of said frame.

13. The enclosure of claim 11 wherein said one or more valves are stainless steel metal valves configured for both inlet and exhaust with double seals.

14. The enclosure of claim 11 wherein nitrogen, argon and other inert gases are inputted into said atmospheric enclosed area via said one or more valves.

15. The enclosure of claim 11 further comprising one or more set screws applied to an opening in said outer side surface to provide an extra seals to said one or more valves.

16. The enclosure of claim 1 wherein said frame is configurable for display of two dimensional (2-D) or three dimensional (3-D) artifacts.

17. The enclosure of claim 1 wherein said frame is configured conventional picture frame moldings for wall hanging or table top display.

18. The enclosure of claim 1 wherein within said enclosure area there is space for environmental materials for atmospheric controls comprising at least one of: zeolites and activated carbon for contamination absorption, oxygen absorbers, silica gel (desicant-moisture absorbers), as well as test/indicator strips, data logging sensors, and an expandable bag for barometric control.

19. The enclosure of claim 1 further comprising a data cable transiting from an outer side surface of said frame to said atmospheric enclosed area for connection to a telemetry device.

* * * * *